Figure 1:
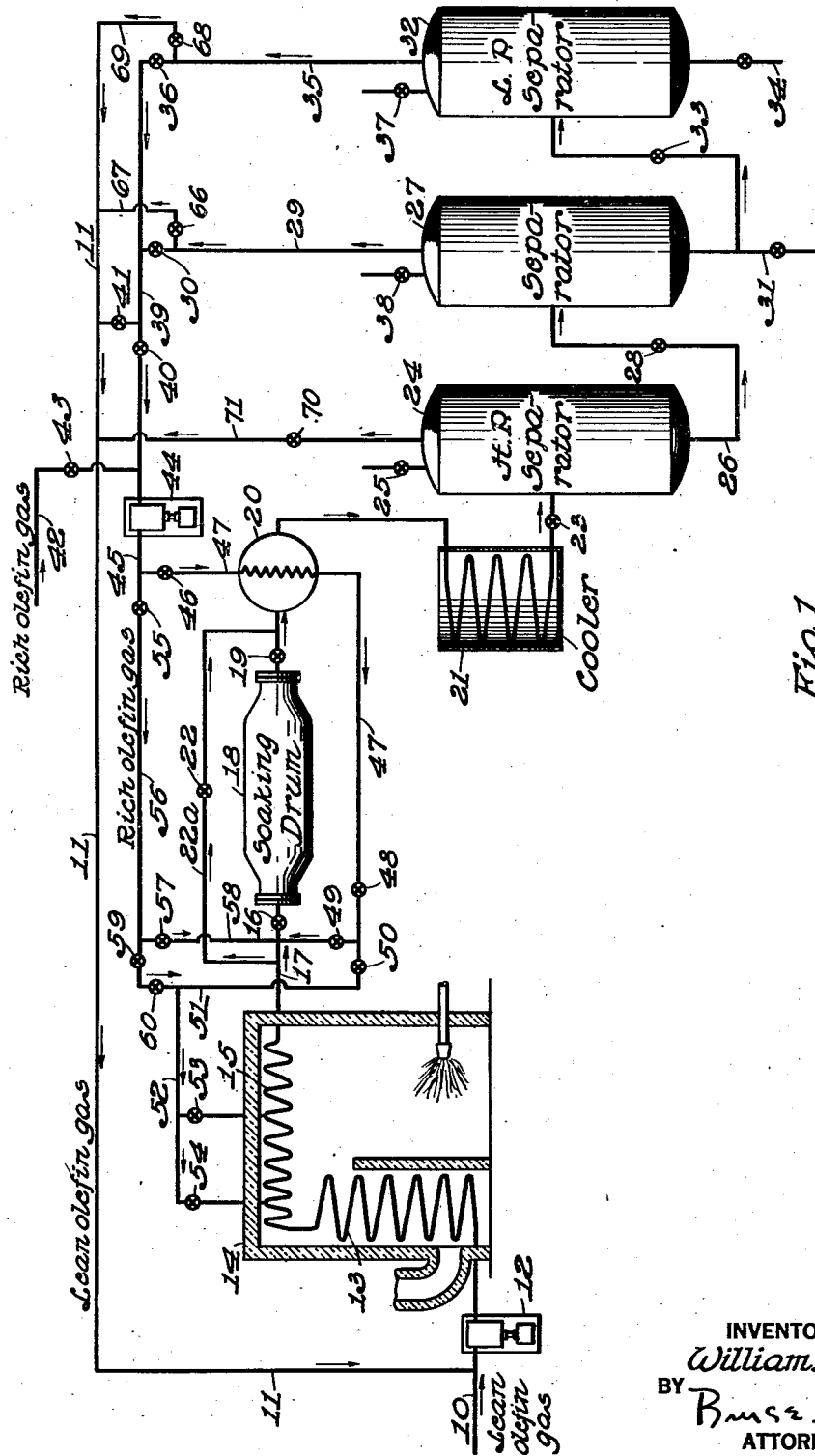

Feb. 13, 1934.   W. B. PLUMMER   1,947,306
POLYMERIZATION OF OLEFINIC GASES
Filed Aug. 24, 1932   2 Sheets-Sheet 2

INVENTOR
William B. Plummer
BY Bruce K. Brown
ATTORNEY

Patented Feb. 13, 1934

1,947,306

UNITED STATES PATENT OFFICE

1,947,306

POLYMERIZATION OF OLEFINIC GASES

William B. Plummer, Chicago, Ill., assignor to Standard Oil Company, Chicago, Ill., a corporation of Indiana Application August 24, 1932. Serial No. 630,285

4 Claims. (Cl. 196—10)

My invention relates to an improved method for the polymerization of olefinic gases to higher boiling liquid hydrocarbons.

It is well known that at pressures of 500-3000 pounds per square inch and at temperatures above 750° F. olefinic gases may be polymerized to liquid products. Conversion is seldom complete in one pass through the system and it has therefore been proposed to recycle unconverted gases, preferably separating fixed and unreactive gases by a high pressure separation step prior to separating olefinic gases in a subsequent low pressure separation step.

I have found that in the operation of a system of this sort, the olefinic gases separated for recycling are ordinarily higher or lower in olefin content than the original gases fed to the system. Whether the olefin content is higher or lower depends on various factors, as later pointed out.

My improved process consists primarily in the separate introduction of the original and recycled olefinic gases to the heating and reaction system. The two separated points of introduction of these gases are so arranged that the gas of lower olefinic content has the longer time of contact in the heating and reaction system. In fact I preferably preheat the rich olefinic gas by interchange only and introduce it into the heating and reaction system immediately prior to the coil or drum soaking stage thereof.

My improved system consists of a furnace containing a preheating or convection coil, a heating or radiant coil, followed by an unheated soaking drum or by a soaking coil located in the convection section of the furnace. Hot reaction gases from the soaking coil or drum ordinarily pass through an interchanger followed by a cooler, a high pressure separator for the elimination of fixed gases, followed by one or more separators wherein olefinic gases are separated and recycled.

The polymerization system operates under pressures of 500-3000 pounds per square inch and at temperatures of 750-1250° F. If the system is operated in the lower part of this temperature range, i. e., about 750-950° F. (which will be the case when the material charged is a relatively rich olefinic gas containing over 50% and ordinarily 60% or more of olefins) the recycled olefinic gas will ordinarily be of lower olefin content than the original. If the polymerization system be operated in the upper part of the temperature range, i. e., about 950° to 1250° F. (which will be the case when the original gas is of low olefin content, i. e., under 60% and ordinarily under 50% of gaseous olefins) then appreciable cracking takes place within the system simultaneously with the polymerization reactions and the recycled olefinic gas will ordinarily be of higher olefin content than the original gas.

In either case the low olefin content gas, whether this be original gas or recycled gas, is introduced into the inlet of the heater. The high olefin content gas, preferably after heat interchange with hot reaction products, is introduced either into the inlet of the soaking drum or soaking coil or into the beginning of or an intermediate point of the heating section.

By this means I find that increased ultimate conversions can be obtained, that appreciable reductions in the size of heating coils may be made, and that the control of reaction temperatures is considerably enhanced. This latter point is an important one since the polymerization of the richer olefinic gases is strongly exothermic and has a tendency to "run away", i. e., to self-heat until the reaction reaches such temperatures that complete cracking to carbon and hydrogen takes place.

Figure 2:
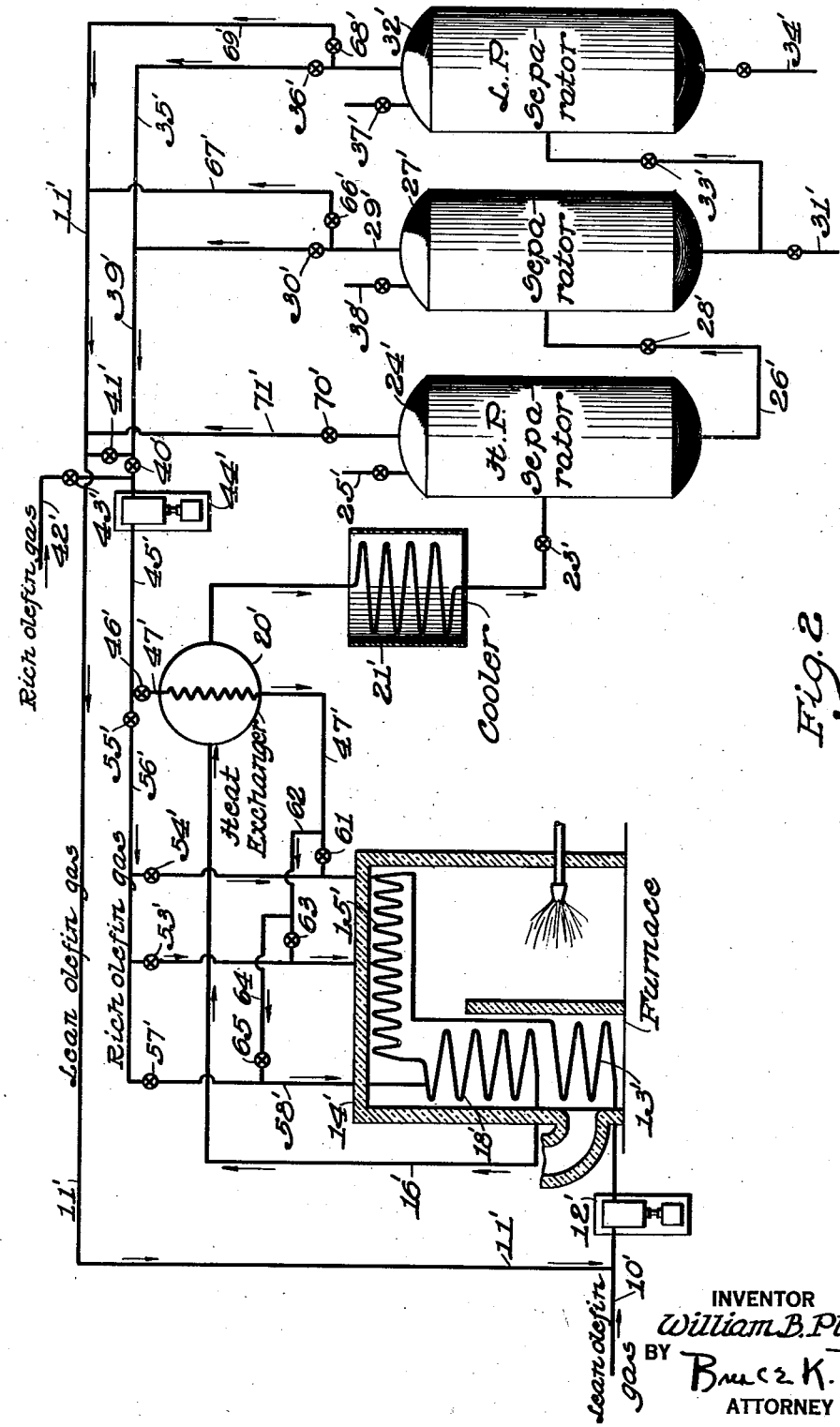

In the accompanying drawings which form a part of this specification:

Figure 1 diagrammatically represents an elevational plan of the system, including a soaking drum for heated reaction products, and Figure 2 illustrates an elevational plan of the system wherein soaking is effected in a pipe heater.

Referring to Figures 1 and 2, Figure 1 shows my improved system when operated with an unheated soaking drum and Figure 2 shows the identical system except for the substitution of a soaking coil (in the convection section of the furnace) for the soaking drum.

The operation of my system may be described in detail as follows: Referring to Figure 1, lean olefinic gases containing less than 60% and ordinarily less than 50% of gaseous olefins, are supplied from an external source through line 10 or are recycled from a later point in the system through line 11, are compressed by pump 12 and introduced into the preheating section 13 of furnace 14. The heated gases then pass through the radiant heating section 15, being joined therein or immediately thereafter by rich olefinic gases containing over 50% and ordinarily over 60% of gaseous olefins and supplied either from an external source or recycled from the system as later described. Combined gases pass through valve 16 in line 17 to soaking chamber 18, then through valve 19 and ordinarily through interchanger 20 prior to being cooled in cooler 21. By closing valves 16 and 19 and opening valve 22 in by-pass 22a, the soaking drum may, if desired, be by-passed.

Cooled products and unreacted gases pass from cooler 21 through valve 23 to separator 24 which operates at essentially full reaction pressure and wherefrom fixed gases which are not capable of further reaction are eliminated through vent 25, while products and dissolved gases are withdrawn through pipe 26 to separator 27 which may operate at a lower pressure than 24, said pressure being regulated by valve 28, or 27 may be supplied with heating means and a feed pump (not shown) and operated at essentially the same pressure as 24, but at a higher temperature. In either case gases and liquid products are separated in 27 and gases may be recycled through line 29 and valve 30, while products are withdrawn through offtake 31. Separator 27 may be followed by second separator 32, in which case 27 is operated at an intermediate pressure or temperature, while 32 is operated at a lower pressure or higher temperature by means of valve 33 or of heating means (not shown), as the case may be. Separator 32 is provided with an offtake 34 for liquid products and offtake 35 with valve 36 for recycle gases and a vent 37 whereby gases may be eliminated from the system. The first separator 27 is also provided with a vent 38 so that controllable portions of gas from either separator may be vented in order to obtain a maximum olefin content in the total recycle gas in line 39.

If the polymerization system is operating with a rich olefin feed gas and under such conditions that the recycle gas is of lower olefin content than the feed gas, the valve 40 is closed and valve 41 is opened and the recycled gases from line 39 pass to line 11, and thus to the inlet of preheating coil 13. In this case the original rich feed gas is introduced through line 42 and valve 43 and is compressed by compressor 44.

If the system is operating on lean olefin gas as original feed and under such conditions that the recycle gases are of higher olefin content, then the lean gas enters the system through line 10 as previously described, and the rich recycle gas, by opening valve 40 and closing valves 43 and 41, passes to the inlet of pump 44.

In either case the rich olefin gas compressed by pump 44 into line 45 is ordinarily passed through valve 46 in line 47 through interchanger 20 whereby it is heated by interchange with reaction products, then passing either through valves 48 and 49 to the inlet of soaking drum 18, or through valves 48, 50, line 51, line 52 and valve 53 to an intermediate point of the heating section 15 or through line 52 and valve 54 to one of the first coils in heating section 15.

Under some circumstances all, or a part of, the rich gases in line 45 may be diverted through valve 55 and line 56 so as not to pass through the interchanger 20. Gases in 56 may pass through valve 57 in line 58 to the inlet of the soaking drum 18 or may pass through valves 59, valve 60, line 52 and valve 53 to an intermediate point in the heating section 15, or through line 52 and valve 54 to one of the first coils in the heating section 15.

Figure 2 shows the identical system with the exception that soaking drum 18 is now replaced by soaking coil 18'. The function of correspondingly numbered elements of Figures 1 and 2 are identical and the operation of the system is the same. Due to the slightly different arrangement in piping and connections, I will, however, redescribe (for the set-up of Figure 2) the flow of rich olefin gases pumped by pump 44' into line 45'. The gases will ordinarily pass through valve 46' in line 47' and thus through interchanger 20'. The heated gases may then be passed through valve 61 in line 47' to one of the first coils of heating section 15', or through line 62 and valve 63 to an intermediate point of heating section 15', or through line 64, valve 65 and line 58' to the inlet of the soaking coil 18'. Under certain conditions, however, all or a part of the gases in line 45' may be by-passed around the interchanger 20', in which case they pass through valve 55' in line 56' and thus may be passed through valve 54' to the first part of the heating coil 15', or through valve 53' to the middle part of heating coil 15' or through valve 57' and line 58' to the inlet of soaking coil 18'.

Depending on the olefin content of the initial gas and that of the recycle gas, I adjust the point of admission of the richer of the two and adjust the amount of heat previously imparted thereto by heat interchange with hot reaction products, thus obtaining optimum temperature conditions for the conversion and obtaining maximum once-through and ultimate yields, in addition to insuring a minimum tendency for the reaction to "run away" with itself, due to liberation of undue quantities of exo-thermic heat at an undesired stage in the heating and reaction system.

As another modification of my process, if I make use of two intermediate separators as shown (27 and 32) in Figure 1 subsequent to the separator 24, I may separate a lean olefin gas in one separator and a rich olefin gas in the other separator, returning the former to the inlet of the heating system and the latter to an intermediate point thereof. Referring to Figure 1, offtake 29 from separator 27 is therefore connected by valve 66 and line 67 with line 11, and offtake 35 from separator 32 is similarly connected through valve 68 and line 69 with line 11 leading to the inlet of the heater. By this means I may pass gas from one separator through line 39 to rich gas line 45 and from the other separator may pass gas to lean gas line 11. Under certain circumstances I may even pass a certain proportion of gas from the initial separator 24 through valve 70 in line 71 to line 11 and thus to the lean gas inlet to the system. Corresponding prime numbered elements in Figure 2 have similar functions.

The operating conditions of high-pressure separators 24 or 24' are ordinarily subject to the limitation that it is frequently preferable not to operate said separators at pressures above 2,000 lbs. per square inch since at the temperatures attainable with ordinary cooling water, separation of phases is frequently unsatisfactory at higher pressures than this. In case, therefore, that I make use of reaction pressures of above 2,000 lbs. I may reduce pressure to at least that point by valve 23 or 23' prior to high-pressure separators 24 or 24'.

Wherever the terms "rich olefinic gas" and "lean olefinic gas" are used herein, I refer to gas containing more than 50% of gaseous olefins and gas containing less than 50% of gaseous olefins by volume respectively.

The foregoing being a full and true description of my invention, I claim:

1. In the process of converting olefinic gases to higher boiling liquid hydrocarbons by polymerizing them at pressures of 500 to 3,000 lbs. per square inch and temperatures of from 750–1250° F. in a system which comprises a preheating zone, a heating zone, a soaking zone, and a recovery system for separating liquid hydrocarbons, high olefin content gases and low olefin content gases, the method of increasing the polymerization efficiency and increasing the yields of polymerized liquid products, which comprises passing low olefin content gases through the preheating zone, heating zone, soaking zone and product recovery means, separately recovering high olefin content gases and low olefin content gases, introducing said low olefin content gases into the system prior to the preheater whereby it will have an extended period of time in the heating coils, and introducing said high olefin content gas into said system prior to the soaking zone and subsequent to said preheating zone.

2. In apparatus of the class described for polymerizing olefinic gases at temperatures of 750–1200° F. and pressures of 500 to 3000 lbs. per square inch and recovering the products produced thereby, a preheater, a high temperature heater, a soaking chamber, means for cooling products leaving said soaking chamber and for removing hydrogen and methane therefrom, means for removing liquids from the remaining products, means for fractionating the resulting gases into fractions of high and low olefin content, means for introducing the low olefin content gases into said preheater and for passing them through said heater and into said soaking chamber, and means for introducing said high olefin content gas into the system at a point between said preheater and said soaking chamber whereby the high olefin content is not subjected to as severe a temperature treatment as the low olefin content gas.

3. In the process of converting olefinic gases to higher boiling liquid hydrocarbons by polymerizing them at pressures of 500 to 3000 lbs. per square inch and temperatures of from 750–1250° F. in a system which comprises a preheating zone, a heating zone, a soaking zone, and a recovery system for separating liquid hydrocarbons from olefin gases, the method of increasing the polymerization efficiency and increasing the yields of polymerized liquid products which comprises recycling at least a part of the olefin gases from the recovery system, passing low olefin content gases through the preheating zone, heating zone, soaking zone and product recovery means, and introducing high olefin content gases into said system prior to the soaking zone and subsequent to said preheating zone.

4. In apparatus of the class described for polymerizing olefinic gases at temperatures of 750–1200° F. and pressures of 500 to 3000 lbs. per square inch and recovering the products produced thereby, a preheater, a high temperature heater, a soaking chamber, means for cooling products leaving said soaking chamber and for removing hydrogen and methane therefrom, means for removing liquids from the remaining gaseous products, means for recycling at least a part of the remaining gaseous products, means for introducing low olefin content gases into said preheater, and means for introducing high olefin content gases into the system at a point between said preheater and said soaking chamber whereby the high olefin content is not subjected to as severe a temperature treatment as the low olefin content gases.

WILLIAM B. PLUMMER.